March 14, 1950 M. N. FAIRBANK 2,500,405

RETICLE MOUNT

Filed Feb. 4, 1946

INVENTOR.
Murry N. Fairbank
BY
Dale A. Bauer
ATTORNEY.

Patented Mar. 14, 1950 2,500,405

UNITED STATES PATENT OFFICE 2,500,405

RETICLE MOUNT

Murry N. Fairbank, Weston, Mass., assignor to Polaroid Corporation, Cambridge, Mass., a corporation of Delaware Application February 4, 1946, Serial No. 645,328

3 Claims. (Cl. 33—46)

This invention relates to the mounting of an optical glass in a holder, and has particular relation to mounting the glass in a precisely adjusted relation with respect to the holder. Although the principles of the invention are thus widely applicable, the description will be directed to the mounting of a reticle in a reticle holder by means embodying the principles of the invention. It is to be understood, however, that this discussion is exemplary and not limitative.

Between the object glass and the eye piece of a military telescope of the sort employed in coordination with guns, there is employed a reticle which most frequently consists of a disc of optically plane glass having scale markings etched into one surface thereof. Such scales are calculated with respect to the characteristics of the telescope to permit the estimation of ranges or to yield other data valuable to the purposes of the observer. If the reticle is to yield accurate information it must be precisely placed with respect to the lenses of the telescope, which under any circumstances requires precise location. However, no two lenses have precisely the same optical characteristics, a fact which greatly increases the difficulty of correctly positioning the reticle. Methods have been devised for aligning a metallic reticle holder with the telescope, but such means do not solve the problem of mounting the reticle in the reticle holder. The problems of mounting the reticle holder in the telescope are comparatively simple because, both parts being of metal, careful machining and known means of adjustment of the machined parts may be employed to obtain precise relations of the parts. More difficulty is experienced in mounting the reticle in a reticle holder because the reticle is of glass, or some other nonmetallic optical material, and the reticle holder is of metal. Furthermore, the holder may be of rectangular shape while the reticle is of circular shape.

Not only is the problem of obtaining a precise initial alignment difficult but an additional problem arises in maintaining the initial relation under the conditions of vibration and shock pertaining, particularly, to military use. Heretofore, because of these difficulties, the problems of obtaining and maintaining a precise mounting of the reticle with respect to the reticle holder are not believed to have been satisfactorily solved.

It is an object of this invention to mount optical glass or the like in a holder of metal or other equivalent material.

Another object of the invention is to adjust a reticle in a reticle holder by simple means admitting of fine control.

Another object is to permanently unite a reticle with a reticle holder in finely adjusted relation without disturbing the adjustment thereof.

Another object is to provide mounting means which are capable of withstanding vibrations and repeated shocks of major magnitude.

Other objects of the invention are in part apparent and in part set forth hereinafter.

The above and further objects and novel features of the invention will more fully appear from the following detailed description when the same is read in connection with the accompanying drawings. It is to be expressly understood, however, that the drawings are intended for the purpose of illustration only, and are not intended as a definition of the limits of the invention, reference for this latter purpose being had primarily to the appended claims.

Fig. 1 of the drawing is an elevational view partly in section of a reticle within a reticle holder showing the novel adjusting means prior to the permanent mounting of the reticle;

Figure 4:
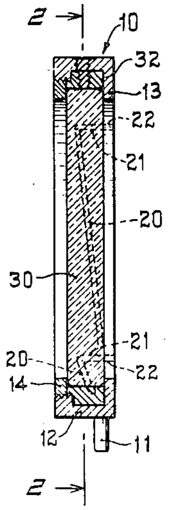

Referring to the numerals of the drawing, 10 is a reticle holder of generally rectangular shape which may be made of any satisfactory material, of which brass is exemplary. Mounted in the holder 10 at one side thereof are pins 11 which are adapted to mount the holder in a telescope. The nature of that mounting is not necessarily part of this invention and further discussion thereof will not be given in the specification. Formed with the holder 10 and constituting a part thereof is an annular wall 12 from one side of which projects an integral annular flange 13 which is of sufficient size to form an abutment for the rim of the reticle, as shown in Fig. 4. The other side of the wall is internally screw threaded for the reception of an externally screw threaded ring 14 which constitutes a second and removable flange. The removable flange 14 is also made, in the modification being described, of brass.

The wall 12 has an opening 15 and an opening 16 both of which may conveniently be round holes, the first of which should be placed upward during the adjustment of the reticle in the holder.

Figure 1:
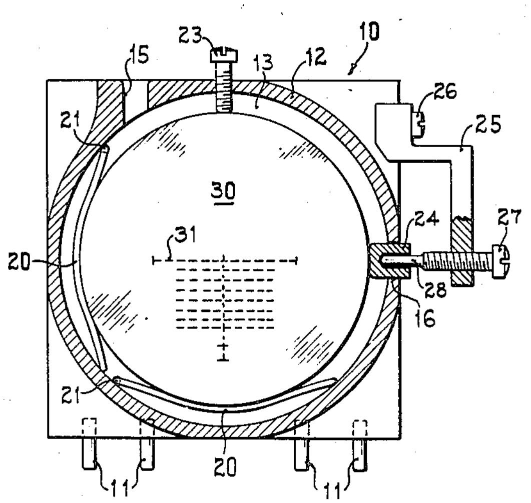
Figure 3:
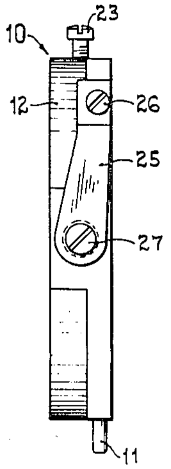
Fig. 3 is a view toward the right hand side of the reticle holder shown in Fig. 1; and, Fig. 4 is a section on the line 4—4 of Fig. 2.

The mounting and adjustment of the reticle in the holder is accomplished by novel means which permit of extremely fine alignment of the parts, yet the means of accomplishing it are simple and inexpensive. Referring particularly to Figs. 1 and 3, two springs 20, 20 are placed at 90 degrees with respect to each other in the annular groove formed by the wall and its flanges. These springs may conveniently be made of pieces of piano wire having one end bent, as at 21, and adapted to be seated in a small hole 22 in the fixed flange 13. The length of the springs is such that they constitute, in effect, chords across the arc of the annulus. The other ends of these springs are preferably left free. The angle between the end 21 and the body of the spring may be such that the free end of the spring will bear against the flange 13, as shown in Fig. 4, and maintain the end 21 in the hole 22 by slight frictional pressure, thus facilitating the mounting of the reticle in the holder by retaining the springs in their seats without attention.

An adjusting screw 23, adapted to bear upon the reticle, is threaded into the wall 12 opposite the center of the lower spring, as shown in Fig. 1, and a plug 24 is adapted to be seated in the hole 16 and to bear against the reticle at a point opposite the center of the vertical spring. A bracket 25 is removably attached to the edge of the holder by means of a screw 26 and carries, screw threaded in the end thereof, an adjusting screw 27 having a pin 28 which is received within a socket in the plug 24 and serves to bias the plug in opposition to the thrust of the opposed spring.

The reticle 30 is mounted in the holder by removing the ring or flange 14, placing the reticle against the flange 13 about as shown in Figs. 1 and 4, and replacing the flange 14, care being taken that the pressure exerted on the rim of the reticle by flanges 13 and 14 does not prevent the adjustment of the reticle within the holder.

The reticle is adjusted with respect to the holder by means of screws 23 and 27. When the proper adjustment has been made, flange 14 may be more firmly seated, care being taken that the adjustment of the reticle is not disturbed thereby. After a precise adjustment, determinable by instruments the nature of which need not be here disclosed, has been attained, a molten metal is poured into the hole 15 and fills the hollow ring formed between the rim of reticle 30, the flanges 13 and 14, and the web 12. This metal should be a low melting point alloy which is adapted to set or solidify from a molten or flowable state without appreciable change of volume. Metals which have been found satisfactory are the alloys commercially known as "Belmont No. 255" and "Cerrosafe" which alloys are manufactured by Belmont Smelting and Refining Company of Brooklyn, New York. The "Belmont" alloy contains approximately 55½% bismuth and 44½% lead.

Figure 2:
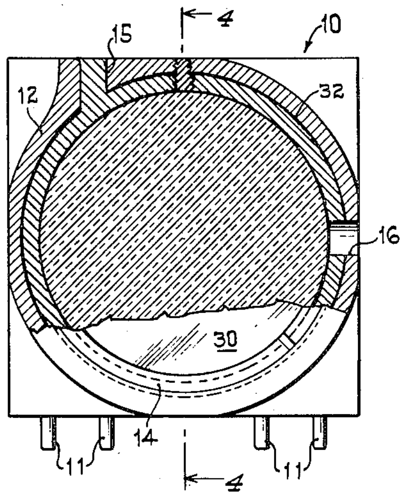
Fig. 2 is a view, partly in section taken substantially on the line 2—2 of Fig. 4, showing the permanent mounting of the reticle in the reticle holder.

When the mounting alloy 32 has hardened or solidified, the bracket 25 and the screw 23 are removed and the hole left by the screw 23 may be filled with the mounting metal as indicated in Fig. 2. The plug 24 is removed, leaving an opening through which light may pass into the edge of the reticle to illuminate the markings 31 etched or otherwise provided upon it. The solidified alloy 32 adheres to or may be caused to interlock with reticle 30 to prevent relative rotation of the latter and holder 10.

The invention has been described in particular relation to the mounting of a reticle, but it is to be understood that the principles thus exemplified are of more general application, being particularly adapted to the permanent mounting of optical glass of all sizes and shapes in holders of other shapes and materials. In application of the principles of the invention to optical bodies of organic nature care must be exercised that the body is not degraded at the temperature of the molten metal.

A particular advantage of this invention is in obtaining precise adjustment of the reticle with respect to its mounting by means of essentially simple nature. Another advantage is in securing permanent mounting of a reticle within a holder that is capable of withstanding severe use without displacement of the parts or disintegration of the mounting. Another advantage of the invention is that the adjusting means are either removed or made impotent when the permanent mounting has solidified. Other advantages of the invention will be apparent to persons skilled in the art.

As many apparently widely different embodiments of this invention may be made without departing from the spirit and scope thereof, it is to be understood that the invention is not limited to the specific embodiments thereof except as defined in the appended claims.

What is claimed is:

1. A holder having an annular groove, a reticle positioned in said groove, said groove receiving the rim of said element and forming therewith a hollow ring, resilient means in the groove adapted to engage the rim of the element, means, carried by said holder and contactable with said element, adapted to bias the element in opposition to said resilient means whereby to adjust the element in the holder, and a quantity of a metallic alloy molded in said groove and around the rim of said element for immovably holding the latter in adjusted position in said holder.

2. A holder for a reticle or the like having an annular groove, a reticle positioned in said groove, said groove receiving the rim of said reticle and forming therewith a hollow ring, springs in the groove adapted to engage the rim of the reticle, a quantity of metallic alloy in said groove from a molten state for uniting said reticle with said holder, and means, carried by said holder and contactable with said reticle, adapted to bias the reticle in opposition to said springs whereby to adjust the reticle before the metallic alloy is introduced into said groove.

3. A reticle holder having an opening therethrough, a reticle mounted in said holder, said holder having an annular wall of greater diameter than the reticle in surrounding relation to said opening, an annular flange fixedly carried by said wall and a second annular flange removably carried by said wall, said flanges adapted to receive the rim of said reticle between them and to form with said wall a hollow ring about the reticle, springs in the hollow ring adapted to engage the rim of the reticle at spaced points, a plurality of removable means supported by said holder and contactable with said reticle adapted to bias the reticle in opposition to said springs, and means comprising a solidified metallic alloy in the hollow ring and engaged with the rim of said reticle for fixing the latter in the holder in a selected position determined by said last-named means.

MURRY N. FAIRBANK.

REFERENCES CITED

The following references are of record in the file of this patent:

UNITED STATES PATENTS

| Number | Name | Date |
|---|---|---|
| 382,088 | Hubert | May 1, 1888 |
| 932,488 | Meyers | Aug. 31, 1909 |
| 1,167,991 | Grebe | Jan. 11, 1916 |
| 1,601,378 | Slade | Sept. 28, 1926 |
| 1,722,520 | Glancy | July 30, 1929 |
| 2,097,850 | Wallace | Nov. 2, 1937 |
| 2,150,629 | Mossburg | Mar. 14, 1939 |
| 2,245,257 | Crumrine | June 10, 1941 |
| 2,344,887 | Liebel | Mar. 21, 1944 |

FOREIGN PATENTS

| Number | Country | Date |
|---|---|---|
| 110,814 | Austria | Oct. 10, 1928 |